United States Patent [19]

Lensvelt et al.

[11] Patent Number: 6,096,852
[45] Date of Patent: Aug. 1, 2000

[54] UV-STABILIZED AND OTHER MODIFIED POLYCARBONATES AND METHOD OF MAKING SAME

[75] Inventors: Cornelis J. Lensvelt, Bergen op Zoom; Johannes Hubertus G. Lohmeijer, Hoogerheide; Peter Serrano, Dordrecht; Gerrit de Wit, Ossendrecht, all of Netherlands

[73] Assignee: General Electric Company, Schenectady, N.Y.

[21] Appl. No.: 09/076,773

[22] Filed: May 12, 1998

[51] Int. Cl.⁷ ....................................... C08G 64/00
[52] U.S. Cl. ............................................. 528/196
[58] Field of Search ................................. 528/196

[56] References Cited

U.S. PATENT DOCUMENTS

| | | | |
|---|---|---|---|
| 3,030,331 | 4/1962 | Goldberg | 528/196 |
| 3,169,121 | 2/1965 | Goldberg | 528/196 |
| 4,055,714 | 10/1977 | Sheppard et al. | 526/208 |
| 4,130,548 | 12/1978 | Kochanowski | 528/197 |
| 4,286,083 | 8/1981 | Kochanowski | 528/173 |
| 4,310,652 | 1/1982 | DeBona et al. | 528/125 |
| 4,354,007 | 10/1982 | Scott | 525/370 |
| 4,576,996 | 3/1986 | Mark et al. | 525/439 |
| 4,713,439 | 12/1987 | St. Clair | 528/353 |
| 4,743,657 | 5/1988 | Rekers et al. | 525/281 |
| 5,034,458 | 7/1991 | Serini et al. | 525/67 |
| 5,292,817 | 3/1994 | Grey et al. | 525/285 |

*Primary Examiner*—Terressa M. Boykin

[57] ABSTRACT

UV-stabilized or other modified polycarbonates are prepared by combining polycarbonate, a radical polymerization initiator and a UV-stabilizer-molecule or other additive such as a flame retardant or IR additive containing a reactive group susceptible to radical attack in a melt. In the melt, the UV-stabilizer or other additive is graft polymerized to the polycarbonate to form a modified polycarbonate. The method can be practiced using bis-phenol-A (BPA) polycarbonates, soft-segment polycarbonates and high heat polycarbonates. The reaction may be performed in an extruder.

39 Claims, 2 Drawing Sheets

Norbloc 7966 + NaOH $\xrightarrow{HCl}$ acrylic acid $\xrightarrow{H_2SO_4}$

Modified (acrylate) Norbloc + $H_2O$

UV-STABILIZED AND OTHER MODIFIED POLYCARBONATES AND METHOD OF MAKING SAME

FIELD OF THE INVENTION

This application relates to UV-stabilized and other modified polycarbonates, and to a method of making such polymers.

Many polymeric materials, including polycarbonates, are sensitive to UV radiation. To counteract this sensitivity, additives have been incorporated into polymers which act as UV stabilizers. This incorporation can occur in several ways.

The simplest approach to incorporation of UV stabilizers is simply to add UV stabilizers to the pre-polymer mixture so that the stabilizer is trapped in the polymer interstices but does not react with the polymer backbone. This approach avoids potentially undesirable changes to the properties of the polymer which may occur as a result of chemical bonding between the polymer chain and the stabilizer. Unfortunately, this approach also introduces its own difficulties, including loss of stabilizer due to plate-out during extrusion, particularly where lower molecular weight stabilizers are used. Stabilizer that is not bound to the polymer may also be lost over time due to environmental leaching and similar processes.

A second approach is incorporation of UV stabilizers into the polymer during polymerization. Molecules which act as UV stabilizers and which contain reactive groups are copolymerized with other polymeric subunits to produce a product in which the UV stabilizer is incorporated within the polymer and which is therefore resistant to leaching. Homopolymerization of the UV stabilizer molecules can and does occur, however, potentially leading to products with a lack of homogeneity. U.S. Pat. No. 4,055,714 discloses compounds which function as both free-radical initiators and UV-stabilizers. These compounds are incorporated at a rate of one or two molecules per polymer.

A third approach is the reactive addition of UV-stabilizers to a polymerized or partially polymerized material, using graft techniques. U.S. Pat. No. 4,743,657 discloses a method for preparing polymer-bound stabilizers using non-homopolymerizable stabilizers, but does not disclose the use of the method with polycarbonates. U.S. Pat. No. 5,556,936 discloses a melt-transesterification process for production of UV-stabilized polycarbonates. The products of this reaction are generally low in molecular weight, however, and there may be a loss of UV-stabilizer function as well.

Notwithstanding these disclosures, there remains a need for a method for reactive incorporation of UV stabilizers into polycarbonates that does not impair or significantly alter the properties of the polymer (molecular weight, optical clarity, etc.) and which provides efficient protection against UV-degradation. It is an object of the present invention to provide such a method.

SUMMARY OF THE INVENTION

The present invention provides a method for preparation of a UV-stabilized or other modified polycarbonate, comprising the step of combining polycarbonate, a radical polymerization initiator and a UV-stabilizer-molecule or other additive such as a flame retardant or IR additive containing a reactive group susceptible to radical attack in a melt. In the melt, the UV-stabilizer or other additive is graft polymerized to the polycarbonate to form a modified polycarbonate. The method of the invention can be practiced using bis-phenol-A (BPA) polycarbonates, soft-segment polycarbonates and high heat polycarbonates. Preferably, the reaction is performed in an extruder.

DETAILED DESCRIPTION OF THE INVENTION

As used in the specification and claims of this application, the term "polycarbonate" includes all variations of the thermoplastic polymers conventionally referred to as polycarbonates, including both aliphatic and aromatic polycarbonates. This includes both homopolymer and copolymer polycarbonates. The polycarbonate may be a linear or branched polymer. Non-limiting examples of such materials include bisphenol A polycarbonates, soft-segment polycarbonates, and high-heat polycarbonate (e.g. APEC from Bayer, INSPIRE from Dow, polycarbonate esters, tetramethyl BPA etc.). Such polycarbonates can generally be prepared by any of the many methods known in the art, including transesterification in a solvent-free reaction mixture with diphenylcarbonate and a bisphenol, and the diphasic/interface process with phosgene and a bisphenol.

Soft-segment polycarbonates are copolyestercarbonates having a reduced glass transition temperatures. Such materials can be made in accordance with U.S. Pat. Nos. 3,030,331, 3,169,121, 4,130,548 and 4,286,083, all of which are incorporated herein by reference. This process basically involves copolyestercarbonate preparation under interfacial conditions using both low and relatively high molecular weight dicarboxylic acids or salts thereof. Examples of acids are oxalic, malonic, dimethylmalonic, succinic, glutaric, adipic and dodecanedioic acids.

High heat polycarbonate can be prepared by various methods including those disclosed in U.S. Pat. Nos. 4,576,996; 4,713,439; 4,310,652; 5,391,693; and 5,034,458 which are incorporated herein by reference.

Figure 1A:
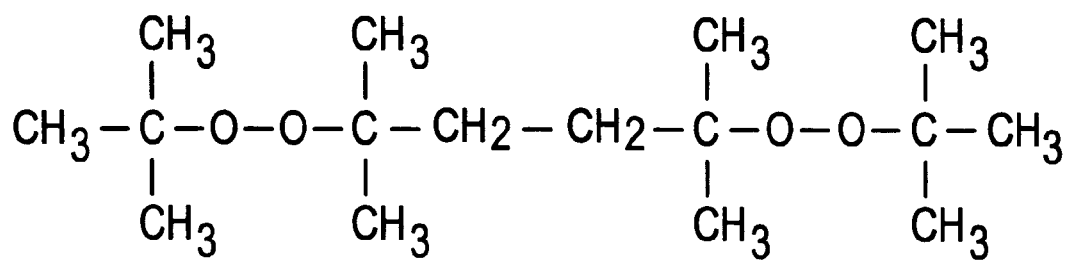
FIGS. 1A and 1B respectively show the structure of an initiator and a UV-stabilizer useful as modifying additives in the method of the invention.

The polycarbonates used in the method of the invention suitably have a molecular weight in the range of 5,000 to 100,000 g/mole determined by GPC calibrated with polystyrene standards (solvent dichloromethane). More preferably, the polycarbonates used in the present invention have a molecular weight of 20,000 to 75,000 grams/mole, In accordance with the present invention, polycarbonates are combined with a radical polymerization initiator and a modifying additive (a UV-stabilizer molecule or other additive) containing a reactive group susceptible to radical attack in a melt. The radical polymerization initiator may be any compound which its capable of initiating a free-radical graft reaction between a modifying additive and the polycarbonate. Examples of suitable radical polymerization initiators include, but are not limited to, peroxides such as TRIGONOX 101® (2,5-bis(tert-butylperoxy)-2,5-dimethylhexane (FIG. 1A), (2,5-bis(tert-butylperoxy)-2,5-dimethylhexyne, di(tertbutyl) peroxide, tert-butylcumyl peroxide, di(ter-amyl)peroxide and di(2-tert-butylperoxy-isoproyl)benzene. All of these initiators have comparable half-lives at the temperatures employed in the process of the invention.

The modifying additives used in the present invention have a modifying moiety and an unsaturated reactive group which is converted to a free radical by the radical polymerization initiator under the conditions found in a polycarbonate melt. The reactive group of the modifying additive may, for example, be selected from among acrylates, methacrylates, styrenic and allylic compounds.

Figure 1B:
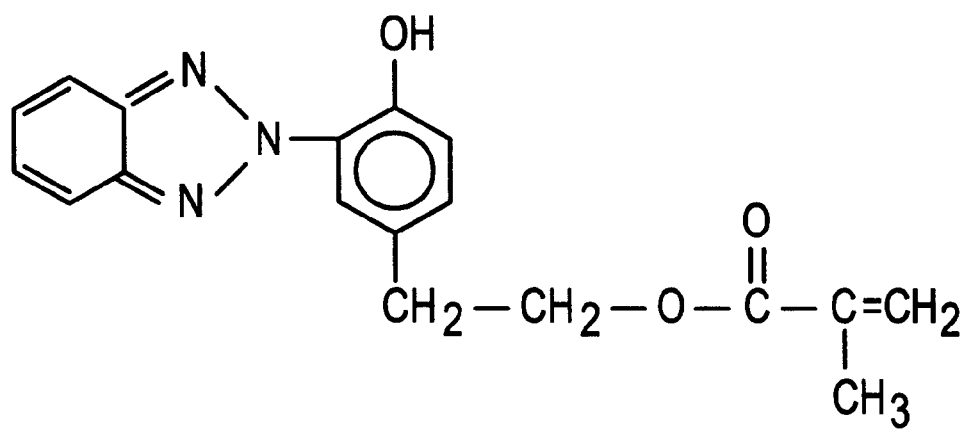

When the modifying additive is a UV-stabilizer, the UV-absorbing portion of the molecule may be a hydroxyaryl benzotriazole or a benzophenone. Specific examples of UV stabilizer molecules useful in the invention include NORBLOC 7966® (2-(2'-hydroxy-5'-methacrylyloxyethylphenyl)-2H-benzotriazole) (FIG. 1B), an acrylate derived from NORBLOC 7966® (2-(2'-hydroxy-5'-acrylyloxyethylphenyl)-2H-benzotriazole) (See Example 3). Other UV stabilizer molecules which might be used in the invention include triazines, cyanoacrylates and oxalanilides as the UV absorbing portion. Examples of additional commercially available UV-stabilizers suitable for use in the invention include those sold under the names UVINUL 3060, LA-87, LA-82, UV-A Bis DHP-A, UV-A Bis DHP-MA, UVINUL X-22, PERMASORB MA and CYASORB UV 416.

Other additive molecules which can be used in the invention include compounds which have a flame-retardant moiety, IR-additives, chain-breaking or peroxide decomposing antioxidant, triplet quencher, or a metal deactivator attached to a reactive group of the type discussed above. Examples of such compositions are well known in the art, and include those listed in U.S. Pat. No. 4,354,007, which is incorporated herein by reference. Stabilizers/modifiers of the type discussed in U.S. Pat. No. 4,743,657 may also be employed. Specific flame retardant additive molecules which might be used in the method of the invention include, but are not limited to, diphenyl-2-acryloyloxyethyl phosphate and diphenyl-2-methacryloyloxyethyl phosphate. The flame-retardant molecules disclosed in U.S. Pat. No. 5,292,817, which is incorporated herein by reference could also be used. IR additives can be any conventional IR additive molecule, modified by conventional chemical techniques if necessary to include a double bond.

In a first embodiment of the invention, the polycarbonate, the initiator and the modifying additive are combined into a single blend and processed to form a melt and to initiate a graft-polymerization reaction. The temperature needed to form a melt will depend on the specific polycarbonate used. The initiation of the radical reaction may occur spontaneously at the melt temperature, or may occur as a result of mechanical mixing at this temperature. Thus, in a preferred format, this embodiment of the invention is performed in an extruder.

In a second embodiment of the invention, the polycarbonate and the modifying additive are combined and melted (with or without extrusion) to provide a preliminary melt composition. The initiator is then added to the preliminary melt composition (either by addition to the preliminary melt or by resolidifying the preliminary melt composition and combining the initiator with the resolidified material before remelting) and the resulting final melt composition is processed to initiate graft polymerization of the modifying additive with the polycarbonate. The temperature needed to form a melt will depend on the specific polycarbonate used. The initiation of the radical reaction may occur spontaneously at the melt temperature, or may occur as a result of mechanical mixing at this temperature. Thus, in a preferred format, this embodiment of the invention is performed in an extruder.

In a third embodiment of the invention, the polycarbonate and the initiator are combined and melted (with or without extrusion) to provide a preliminary melt composition. The modifying additive is then added to the preliminary melt composition (either by addition to the preliminary melt or by resolidifying the preliminary melt composition and combining the initiator with the resolidified material before remelting) and the resulting final melt composition is processed to initiate graft polymerization of the modifying additive with the polycarbonate. The temperature needed to form a melt will depend on the specific polycarbonate used. The initiation of the radical reaction may occur spontaneously at the melt temperature, or may occur as a result of mechanical mixing at this temperature. Thus, in a preferred format, this embodiment of the invention is performed in an extruder.

It will be appreciated by persons skilled in the art that the specific operating parameters of an extruder will depend on the particular extruder and particular polycarbonate employed. By way of example, however, using a PRISM TSE16 corotating twin screw mini-extruder, which has five successive heating zones suitable processing uses temperature settings in the heating zones of T=40, 225, 230, 240, 240 and a speed of 200 rpm. More generally, the temperatures in five zone extruder are suitably 40–105° C. (feeding side), 200–295° C., 210–295° C., 230–310° C. and 245–310° C. (nozzle).

Modified polycarbonates in accordance with the invention exhibit minimal molecular weight loss, and minimal loss of clarity. Although homopolymerization of the modifying additive occurs to some extent, the solubility of the oligomers is such that they remain soluble in the polycarbonate and thus do not detract from the quality of the product. In addition, it has been demonstrated that UV-stabilized polycarbonates in accordance with the invention have properties comparable to the known UV-stabilized polycarbonates prepared using other methods. Thus, although it might be the case that radical reaction occurs with the modifying moiety of the modifying additive rather than the reactive group, the incidence of such reactions is sufficiently low that the modifying function of the modifying additive is maintained.

The invention will now be further described with reference to the following non-limiting examples.

EXAMPLE 1

Mixtures of soft-segment polycarbonate (copolycarbonate of bisphenol-A and dodecanedioic acid (10%)) TRIGONOX 101 as an initiator and NORBLOCÔ 7966 as a UV stabilizer were dry blended and extruded in a twin screw mini-extruder (PRISM TSE 16). The blends were processed in the five zones of the extruder at temperatures of 40-225-230-240-240° C. The screw speed was 200 rpm. As a reference, a blend of the soft-segment polycarbonate using 5% TINUVIN® 1577 as the UV-stabilizer was also prepared.

The amount of free, polymerized and grafted UV-stabilizer was determined by GPC using a UV detector. The polymer was dissolved in dichloromethane and precipitated in cyclohexane. Free stabilizer remained in the solvent mixture. The precipitate was analyzed in a GPC column at different wavelengths, 230 nm for PC and 336 nm for grafted stabilizer. The results are summarized in Table 1.

$^1$H NMR confirmed the loss of the double bond associated with the methacrylate group and the appearance of broader methacrylate peaks indicating the formation of a polymeric material. Unreacted UV-stabilizer and homopolymerized oligomers of the UV-stabilizer were also present. Both the free UV-stabilizer and the oligomers were soluble in the polycarbonate, such that the product remained transparent with a clear to yellowish color.

The weight loss of the stabilizer is measured with TGA (30 min. at 300° C., and during a heating ramp from 125 to 325° C., heating rate 10° C./min.

nitrogen and then charged with 5 grams (15.5 mmol) NOR-BLOC 7966, (2-(2'-hydroxy-5'-methacrylyloxyethylphenyl)-2H-benzotriazole) and 100 ml 2M NaOH. After one hour stirring, the pH was lowered to 1 with concentrated HCl. A white product precipitated and was filtered off. After rinsing with water, the product was dried overnight. Yield was 3.72 grams (94%). IR analysis

TABLE 1

| UV Stab (%, form) | Initiator | Total UV Stab found | | | $Mw^*$ (g/mol) | Mw/Mn | weight loss (wt %, 300° C.) | weight loss (wt %, 125–325° C.) |
|---|---|---|---|---|---|---|---|---|
| | | grafted (wt %) | oligos (wt %) | free (wt %) | | | | |
| 0 | 0 | — | — | — | 57900 | 2.59 | 0.17 | 0.13 |
| 0 | 2 | — | — | — | 61900 | 2.95 | 0.42 | 0.51 |
| 5 | 0 | 4.8 | | | 60700 | 2.67 | 2.64 | 1.48 |
| | | — | — | 4.8 | | | | |
| 5 | 2 | 3.0 | | | 55500 | 2.85 | 1.42 | 1.02 |
| | | 0.7 | 1.4 | 0.9 | | | | |
| 5 | 5 | 3.9 | | | 56600 | 3.17 | 1.51 | 1.08 |
| | | 1.5 | 1.7 | 0.7 | | | | |
| 5 | 10 | 4.1 | | | 66200 | 3.70 | 1.61 | 1.01 |
| | | 1.9 | 1.6 | 0.6 | | | | |
| 10 | 2 | 8.2 | | | 58800 | 3.45 | 3.11 | 1.86 |
| | | 0.4 | 4.3 | 3.5 | | | | |
| 10 | 5 | 8.4 | | | 60000 | 3.43 | 3.65 | 2.01 |
| | | 1.8 | 5.4 | 1.2 | | | | |
| tinuvin 5% | 0 | — | — | — | — | — | 0.97 | — |

*molecular weights are relative to polystyrene standards.

EXAMPLE 2

The experiment described in Example 1 was repeated using a linear BPA polycarbonate (PC 135), except that the temperature setting in the extruder were 40-295-295-310-310° C. The products remained transparent and were clear to yellowish in color. The amounts of incorporation of the UV-stabilizer and the observed loss of molecular weight are summarized in Table 2. In a further experiment, 0.4% tert-butyl hydroperoxide was used in place of TRIGONOX 101, no grafting and very little homopolymerization of the UV-stabilizer was observed.

showed the disappearance of the carboxyl group and the appearance of a hydroxyl group.

3.72 grams (14.6 mmol) of the product was dissolved in 50 ml tetrahydrofuran. To this solution, 1.05 ml (15.3 mmol) acrylic acid and 10 droplets concentrated $H_2SO_4$ were added. After 10 hours of refluxing, the THF was evaporated and the product washed with water. Subsequently, the yellowish product was dried. IR and GC-MS analysis confirmed the appearance of an acrylate group in the product. Overall yield was 73%.

TABLE 2

| UV Stab (%, form) | Initiator | Total UV Stab found | | | Mw (g/mol) | Mw/Mn | weight loss (wt %, 300° C.) | weight loss (wt %, 125–325° C.) |
|---|---|---|---|---|---|---|---|---|
| | | grafted (wt %) | oligos (wt %) | free (wt %) | | | | |
| 0 | 0 | — | — | — | 74200 | 2.73 | 0.07 | 0.23 |
| 5 | 2 | 3.3 | | | 63300 | 2.72 | 1.37 | 0.97 |
| | | 0.2 | 1.7 | 1.4 | | | | |
| 5 | 5 | 3.9 | | | 57600 | 2.97 | 1.29 | 0.78 |
| | | 0.9 | 2.1 | 0.9 | | | | |
| tinuvin 5% | 0 | — | — | — | | | 0.49 | — |

EXAMPLE 3

Preparation of Modified NORBLOCÔ 7966 Stabilizer

Figure 2:
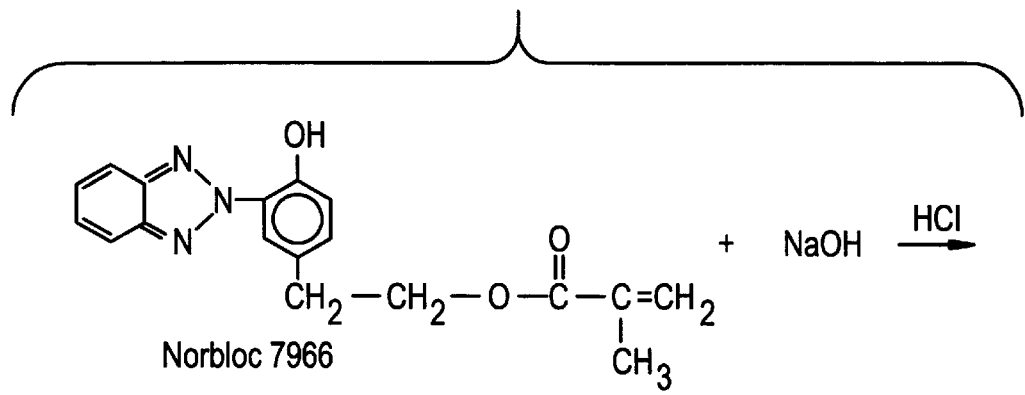
FIG. 2 shows a reaction scheme for conversion of a methacrylate UV-stabilizer to an acrylate UV-stabilizer.
Figure 2:
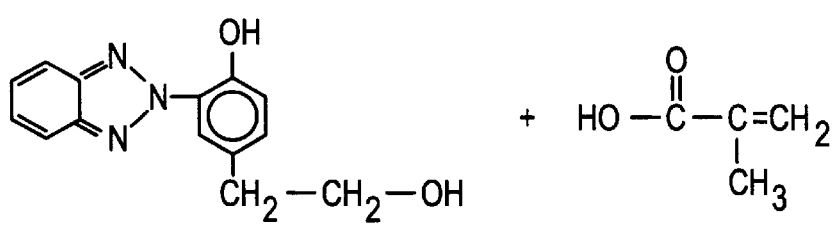
Figure 2:
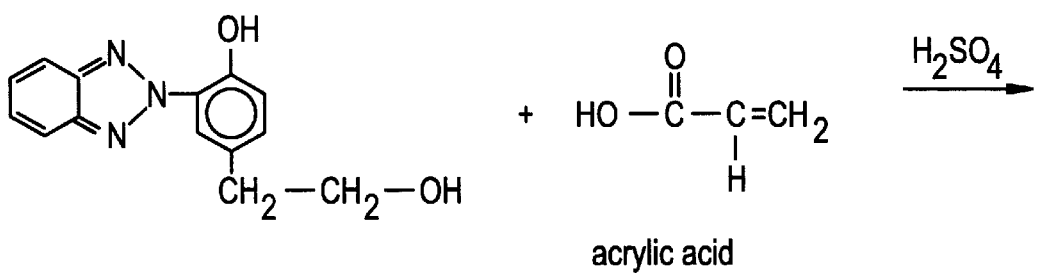
Figure 2:
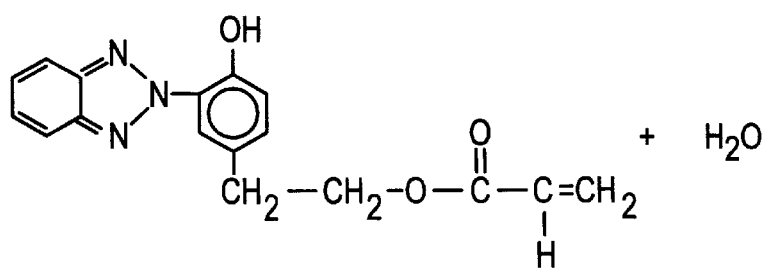

To increase the reactivity of NORBLOCÔ 7988 UV-stabilizer (FIG. 1A), the methacrylate group was replaced by an acrylate group using a reaction scheme as illustrated in FIG. 2. A three neck flask was flushed with

EXAMPLE 4

The experiments of Examples 1 and 2 were repeated using the modified acrylate form of the UV stabilizer prepared in accordance with Example 3. The results are summarized in Table 3.

TABLE 3

| UV Stab (%, form) | Initiator | grafted (wt %) | oligos (wt %) | free (wt %) | Mw (g/mol) | Mw/Mn | weight loss (wt % 300° C.) |
|---|---|---|---|---|---|---|---|
| Soft-Segment Polycarbonate | | | | | | | |
| 5 | 2 | 5.0 | | | 34100 | 2.96 | 0.78 |
| | | 2.8 | 1.7 | 0.5 | | | |
| 5 | 5 | 3.8 | | | 42600 | 3.04 | 0.97 |
| | | 1.8 | 1.6 | 0.4 | | | |
| PC 135 | | | | | | | |
| 5 | 5 | 3.9 | | | 62400 | 3.01 | 0.45 |
| | | 0.8 | 2.1 | 1.0 | | | |

EXAMPLE 5

UV absorption properties were measured for various modified polycarbonates made in accordance with the invention to confirm that UV functionality was still present after the grafting reaction. LA-31 and cyasorb-5411 are benzotriazoles UV-absorbers which are incapable of a grafting to the polymer, and these materials were included as controls. uvinul-3060 is capable of grafting to the polycarbonate under the reaction conditions and is presumed to have done so, although formation of graft polymers was not to confirmed. The results are summarized in Table 4. As can be seen from the UV-absorption (expressed as a percentage of theoretical maximum), while there is some loss of UV functionality, the overall absorption remains good.

TABLE 4

UV absorption for different compositions of the reactive PC/UV-stabilizer systems.

| norbloc-7966 (wt %) | LA-31 (wt %) | cyasorb-5411 (wt %) | uvinul-3060[b] (wt %) | TBHP (wt %) | trigonox 101 sol (wt %) | trigonox 101 liq (wt %) | UV-absorp. (%) |
|---|---|---|---|---|---|---|---|
| 4[a] | — | — | — | 0.3 | — | — | 77.2 |
| 8[a] | — | — | — | 0.4 | — | — | 82.8 |
| 8 | — | — | — | 0.6 | — | — | 79.4 |
| 2 | — | — | — | — | — | 0.2 | 97.0 |
| 4 | — | — | — | — | — | 0.5 | 94.8 |
| 4 | — | — | — | — | — | 1.0 | 98.2 |
| 4 | — | — | — | — | — | — | 94.6 |
| — | 10 | — | — | — | — | 1.5 | 95.1 |
| — | 10 | — | — | — | 1.5 | — | 93.0 |
| — | 10 | — | — | — | — | — | 91.3 |
| — | — | 10 | — | — | — | 2.0 | 90.9 |
| — | — | 10 | — | — | 1.0 | — | 93.2 |
| — | — | 10 | — | — | 2.0 | — | 90.1 |
| — | — | 10 | — | — | — | — | 102.4 |
| — | — | — | 4 | — | 1.0 | — | 69.1 |
| — | — | — | 4 | — | 2.0 | — | 64.3 |
| — | — | — | 4 | — | — | 2.0 | 75.4 |

TBHP = tert-butyl hydroperoxide,
liq = liquid trigonox 101,
sol = trigonox 101 on silica.
[a] = PC135, other blends soft segment PC,
[b] benzophenone, other stabilizers benzotriazoles.

We claim:

1. A method for preparation of a modified polycarbonate, comprising the step of combining polycarbonate, a radical polymerization initiator and a modifying additive molecule containing a modifying moiety and a reactive group susceptible to radical attack in a melt, whereby the modifying additive molecule is graft polymerized to the polycarbonate to form a modified polycarbonate.

2. The method according to claim 1, wherein the graft polymerization is performed in an extruder.

3. The method according to claim 1, wherein the modifying additive is a UV stabilizer.

4. The method according to claim 3, wherein the UV stabilizer is a benzotriazole or a benzophenone.

5. The method according to claim 4, wherein the UV stabilizer is (2-(2'-hydroxy-5'-methacrylyloxyethylphenyl)-2H-benzotriazole) or (2-(2'-hydroxy-5'-acrylyloxyethylphenyl)-2H-benzotriazole).

6. The method according to claim 5, wherein the initiator is (2,5-bis(tert-butylperoxy)-2,5-dimethylhexane.

7. The method according to claim 1, wherein the initiator is (2,5-bis(tert-butylperoxy)-2,5-dimethylhexane.

8. The method according to claim 1, wherein the polycarbonate, the initiator and the modifying additive are combined into a single blend and processed to form a melt and to initiate a graft-polymerization reaction.

9. The method according to claim 8, wherein the graft polymerization is performed in an extruder.

10. The method according to claim 8, wherein the modifying additive is a UV stabilizer.

11. The method according to claim 10, wherein the UV stabilizer is a benzotriazole or a benzophenone.

12. The method according to claim 11, wherein the UV stabilizer is (2-(2'-hydroxy-5'-methacrylyloxyethylphenyl)-2H-benzotriazole) or (2-(2'-hydroxy-5'-acrylyloxyethylphenyl)-2H-benzotriazole).

13. The method according to claim 12, wherein the initiator is (2,5-bis(tert-butylperoxy)-2,5-dimethylhexane.

14. The method according to claim 8, wherein the initiator is (2,5-bis(tert-butylperoxy)-2,5-dimethylhexane.

15. The method according to claim 1, wherein the polycarbonate and the modifying additive are combined and melted to provide a preliminary melt composition, and the initiator is then added to the preliminary melt composition, with or without resolidifying the preliminary melt composition, and the resulting final melt composition is processed to initiate graft polymerization of the modifying additive with the polycarbonate.

16. The method according to claim 15, wherein the graft polymerization is performed in an extruder.

17. The method according to claim 15, wherein the modifying additive is a UV stabilizer.

18. The method according to claim 17, wherein the UV stabilizer is a benzotriazole or a benzophenone.

19. The method according to claim 18, wherein the UV stabilizer is (2-(2'-hydroxy-5'-methacrylyloxyethylphenyl)-2H-benzotriazole) or (2-(2'-hydroxy-5'-acrylyloxyethylphenyl)-2H-benzotriazole).

20. The method according to claim 19, wherein the initiator is (2,5-bis(tert-butylperoxy)-2,5-dimethylhexane.

21. The method according to claim 15, wherein the initiator is (2,5-bis(tert-butylperoxy)-2,5-dimethylhexane.

22. The method according to claim 1, wherein the polycarbonate and the initiator are combined and melted to provide a preliminary melt composition, and the modifying additive is then added to the preliminary melt composition, with or without resolidifying the preliminary melt composition, and the resulting final melt composition is processed to initiate graft polymerization of the modifying additive with the polycarbonate.

23. The method according to claim 22, wherein the graft polymerization is performed in an extruder.

24. The method according to claim 22, wherein the modifying additive is a UV stabilizer.

25. The method according to claim 24, wherein the UV stabilizer is a benzotriazole or a benzophenone.

26. The method according to claim 25, wherein the UV stabilizer is (2-(2'-hydroxy-5'-methacrylyloxyethylphenyl)-2H-benzotriazole) or (2-(2'-hydroxy-5'-acrylyloxyethylphenyl)-2H-benzotriazole).

27. The method according to claim 26, wherein the initiator is (2,5-bis(tert-butylperoxy)-2,5-dimethylhexane.

28. The method according to claim 22, wherein the initiator is (2,5-bis(tert-butylperoxy)-2,5-dimethylhexane.

29. A modified polycarbonate, comprising a polycarbonate portion and a modifying additive graft polymerized to the polycarbonate.

30. The modified polycarbonate of claim 29, wherein the polycarbonate is a BPA-polycarbonate or a soft-segment polycarbonate.

31. The modified polycarbonate of claim 30, wherein the modifying additive is a UV stabilizer.

32. The modified polycarbonate according to claim 31, wherein the UV stabilizer is a benzotriazole or a benzophenone.

33. The modified polycarbonate according to claim 32, wherein the UV stabilizer is (2-(2'-hydroxy-5'-methacrylyloxyethylphenyl)-2H-benzotriazole) or (2-(2'-hydroxy-5'-acrylyloxyethylphenyl)-2H-benzotriazole).

34. A modified polycarbonate, comprising a polycarbonate portion and a modifying additive graft polymerized to the polycarbonate prepared by combining polycarbonate, a radical polymerization initiator and a modifying additive molecule containing a modifying moiety and a reactive group susceptible to radical attack in a melt, whereby the modifying additive molecule is graft polymerized to the polycarbonate to form a modified polycarbonate.

35. The modified polycarbonate of claim 34, wherein the polycarbonate is a BPA-polycarbonate or a soft-segment polycarbonate.

36. The modified polycarbonate of claim 35, wherein the modifying additive is a UV stabilizer.

37. The modified polycarbonate according to claim 36, wherein the UV stabilizer is a benzotriazole or a benzophenone.

38. The modified polycarbonate according to claim 37, wherein the UV stabilizer is (2-(2'-hydroxy-5'-methacrylyloxyethylphenyl)-2H-benzotriazole).

39. The modified polycarbonate according to claim 37, wherein the UV stabilizer is (2-(2'-hydroxy-5'-acrylyloxyethylphenyl)-2H-benzotriazole).

* * * * *